United States Patent
Billman et al.

(10) Patent No.: US 11,163,943 B2
(45) Date of Patent: Nov. 2, 2021

(54) METHOD AND SYSTEM FOR PARTIAL APPLICATION DATA COLLECTION

(71) Applicant: Comenity LLC, Columbus, OH (US)

(72) Inventors: Christian Billman, Gahanna, OH (US); Uchenna Chilaka, Gahanna, OH (US)

(73) Assignee: Comenity LLC, Columbus, OH (US)

( * ) Notice: Subject to any disclaimer, the term of this patent is extended or adjusted under 35 U.S.C. 154(b) by 178 days.

(21) Appl. No.: 15/915,860

(22) Filed: Mar. 8, 2018

(65) Prior Publication Data

US 2019/0114314 A1    Apr. 18, 2019

Related U.S. Application Data

(60) Provisional application No. 62/574,123, filed on Oct. 18, 2017.

(51) Int. Cl.
| | |
|---|---|
| *G06F 40/174* | (2020.01) |
| *G06F 16/13* | (2019.01) |
| *G06F 16/14* | (2019.01) |
| *G06F 16/23* | (2019.01) |
| *G06F 40/186* | (2020.01) |

(52) U.S. Cl.
CPC ............ *G06F 40/174* (2020.01); *G06F 16/13* (2019.01); *G06F 16/148* (2019.01); *G06F 16/2379* (2019.01); *G06F 40/186* (2020.01)

(58) Field of Classification Search
CPC .. G06F 17/243; G06F 16/2379; G06F 16/148; G06F 16/13; G06F 17/248; G06F 40/174; G06F 40/186

USPC ........................................................ 715/223
See application file for complete search history.

(56) References Cited

U.S. PATENT DOCUMENTS

| | | | |
|---|---|---|---|
| 7,739,431 B2 | 6/2010 | Lyness et al. | |
| 8,037,402 B2* | 10/2011 | Foushee, Jr. | .......... G06F 17/243 |
| | | | 715/223 |
| 9,342,687 B2 | 5/2016 | Boodaei | |
| 2005/0278630 A1* | 12/2005 | Bracey | ................ G06F 11/3438 |
| | | | 715/704 |
| 2006/0053047 A1* | 3/2006 | Garcia | ................... G06Q 30/02 |
| | | | 705/14.64 |
| 2007/0288359 A1 | 12/2007 | Amadio et al. | |
| 2010/0037158 A1* | 2/2010 | Commarford | ...... G06F 3/04892 |
| | | | 715/764 |
| 2012/0143958 A1* | 6/2012 | Augustine | ............. G06F 17/248 |
| | | | 709/205 |
| 2014/0172812 A1 | 6/2014 | Chisalita et al. | |
| 2015/0081521 A1 | 3/2015 | Leighton et al. | |

(Continued)

*Primary Examiner* — Hope C Sheffield

(57) ABSTRACT

Methods and systems for partial application data collection are disclosed. The method stores a network accessible application having a plurality of form fields. One or more processors generate a session identifier (ID) and timestamp for a user accessing the application. The one or more processors determine that a state within a form field of one of the plurality of form fields is in focus, the state of the form field being in focus when the user selects the form field. Additionally, it is determined when the state within the form field is no longer in focus. At that time, a countdown timer is initiated. When the countdown time reaches zero, any data entered into the form field is collected. The collected data and the session ID are then combined into a single user data file.

20 Claims, 6 Drawing Sheets

(56) References Cited

U.S. PATENT DOCUMENTS

2015/0205776 A1\* 7/2015 Bhatia .................. G06F 17/243
 715/226

\* cited by examiner

200

```
┌─────────────────────────────────────────────────────────────┐
│ STORES, AT A MEMORY OF A DEVICE, AN APPLICATION HAVING A    │
│ PLURALITY OF FORM FIELDS, THE APPLICATION ACCESSIBLE TO     │
│ OTHER DEVICES OVER A NETWORK CONNECTION                     │
│                          205                                │
└─────────────────────────────────────────────────────────────┘
                              │
                              ▼
┌─────────────────────────────────────────────────────────────┐
│ DETERMINES, BY ONE OR MORE PROCESSORS ON THE DEVICE, THAT   │
│ THE USER IS ACCESSING THE APPLICATION FROM A USER'S DEVICE  │
│                          210                                │
└─────────────────────────────────────────────────────────────┘
                              │
                              ▼
┌─────────────────────────────────────────────────────────────┐
│ GENERATES, BY THE ONE OR MORE PROCESSORS, A SESSION         │
│ IDENTIFIER (ID) FOR THE USER ACCESSING THE APPLICATION,     │
│ THE SESSION ID INCLUDING A TIMESTAMP                        │
│                          215                                │
└─────────────────────────────────────────────────────────────┘
                              │
                              ▼
┌─────────────────────────────────────────────────────────────┐
│ DETERMINES, BY THE ONE OR MORE PROCESSORS, THAT A STATE     │
│ WITHIN A FORM FIELD OF ONE OF THE PLURALITY OF FORM FIELDS  │
│ IS IN FOCUS                                                 │
│                          220                                │
└─────────────────────────────────────────────────────────────┘
                              │
                              ▼
┌─────────────────────────────────────────────────────────────┐
│ DETERMINES, BY THE ONE OR MORE PROCESSORS, THAT A STATE     │
│ WITHIN A FORM FIELD IS NO LONGER IN FOCUS                   │
│                          225                                │
└─────────────────────────────────────────────────────────────┘
                              │
                              ▼
┌─────────────────────────────────────────────────────────────┐
│ INITIATES, BY THE ONE OR MORE PROCESSORS, A COUNTDOWN       │
│ TIMER, THE COUNTDOWN TIMER INITIATES WHEN THE ONE OR MORE   │
│ PROCESSORS DETERMINE THAT THE FORM FIELD IS NO LONGER IN    │
│ FOCUS                                                       │
│                          230                                │
└─────────────────────────────────────────────────────────────┘
                              │
                              ▼
┌─────────────────────────────────────────────────────────────┐
│ COLLECTS, BY THE ONE OR MORE PROCESSORS AND WHEN THE        │
│ COUNTDOWN TIMER REACHES ZERO, ANY DATA ENTERED INTO THE     │
│ FORM FIELD                                                  │
│                          235                                │
└─────────────────────────────────────────────────────────────┘
                              │
                              ▼
┌─────────────────────────────────────────────────────────────┐
│ COMBINES, BY THE ONE OR MORE PROCESSORS, ALL OF THE         │
│ COLLECTED DATA AND THE SESSION ID INTO A SINGLE USER DATA   │
│ FILE                                                        │
│                          240                                │
└─────────────────────────────────────────────────────────────┘
```

Please enter your:

| 301 | Name |

Please enter your:

| 302 | Home Address |

Please enter your:

| 303 | Telephone Number |

Please enter your:

| 304 | Email Address |

Please enter your:

| n | Employer |

FIG. 3

METHOD AND SYSTEM FOR PARTIAL APPLICATION DATA COLLECTION

CROSS-REFERENCE TO RELATED APPLICATIONS (PROVISIONAL)

This application claims priority to and benefit of U.S. Provisional Patent Application No. 62/574,123 filed on Oct. 18, 2017, entitled "METHOD AND SYSTEM FOR PARTIAL APPLICATION DATA COLLECTION" by Christian Billman et al., and assigned to the assignee of the present application, the disclosure of which is hereby incorporated herein by reference in its entirety.

BACKGROUND

Presently, a good percentage of applications that are attempted by users result in an abandonment of the application. The abandonment can be due to many factors including: length of the application, complexity of the application, interne connectivity issues, technical issues, and the like. In some instances the abandonment can be caused by lock issues created by the placement of the scrollbar, or other application design flaws.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 2 is a flowchart of a method for obtaining information in a form field by form field manner for an application, in accordance with an embodiment.

FIG. 3 is a block diagram of an example application, in accordance with an embodiment.

DESCRIPTION OF EMBODIMENTS

Figure 1:
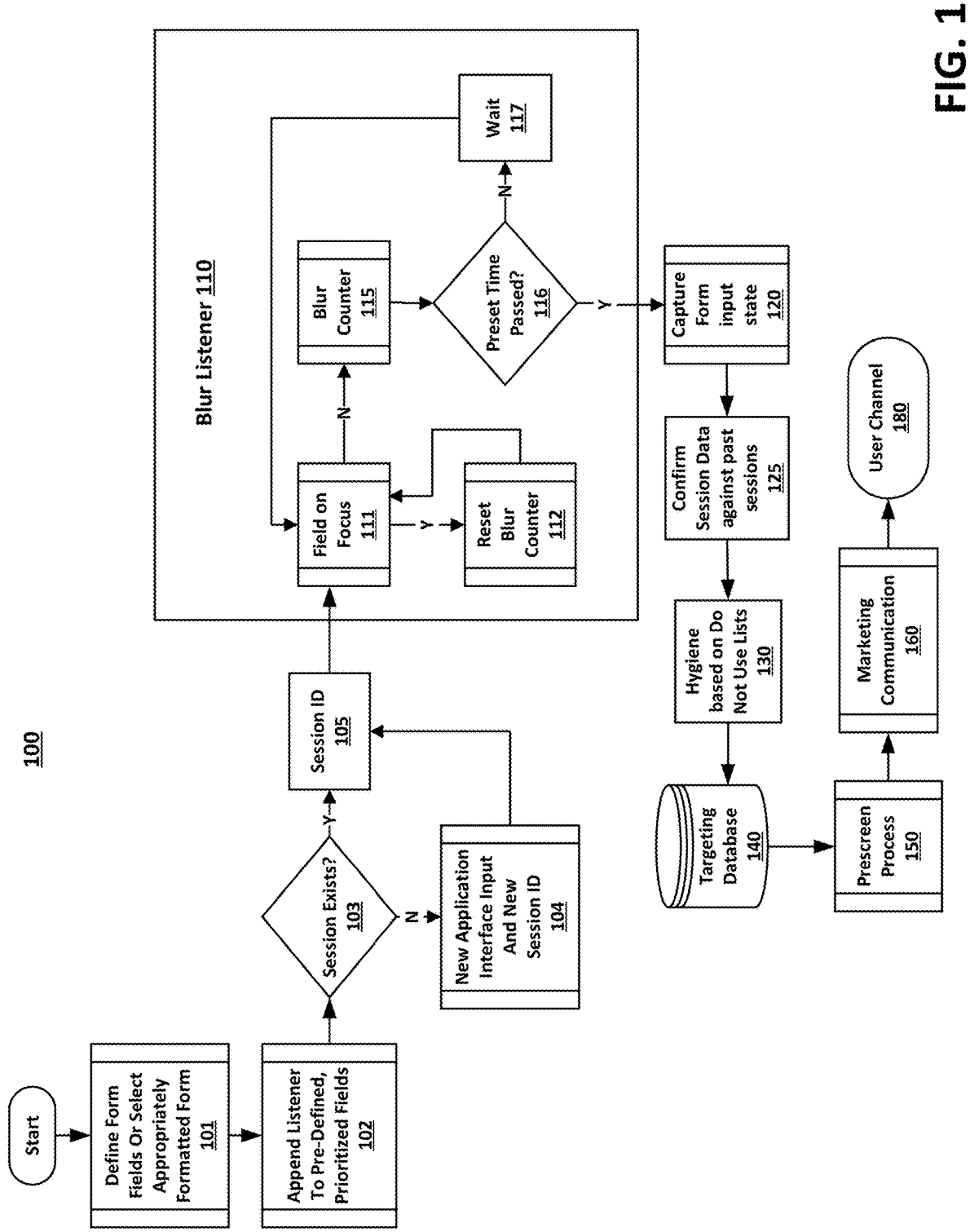
FIG. 1 is a block diagram of a system for partial data collection, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "determining", "collecting", "combining", "pre-screening", "developing", "presenting", "initiating", "resetting", or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

Application form information acquisition is discussed herein. In general, form abandonment occurs when a user needs to fill out a form and when the user quits filling out the form before the form is completed. For example, the form is partially completed but still includes a number of questions that are unanswered. Sometimes, form abandonment occurs because the process is taking too long, or the user has run out of time to complete the information requested before they must move on to a different matter. Other times, form abandonment occurs because a connection between the user's device and the form is lost or the information on the form cannot be accessed on the device. For example, the user's device has run out of power, has encountered bad or no connectivity, there is a problem in the form presentation (e.g., screen form factor shortcomings, page layout design errors, etc.) there is some type of interruption that causes the connection between the user's device and the device hosting the form to be severed, or the like.

Embodiments described herein, allow the information that has been entered into the form to be captured by the device hosting the form in near-real time. As will be described herein, within a time period after each field within the application form is accessed, the information within the field will be collected. This information will be stored, not on the user's device, but instead at another device, such as the device hosting the application. By collecting the information as the fields are completed, the information that is provided prior to abandonment can be stored in a file. That information can then be reviewed to determine if enough information exists for a follow-on contact to be provided to the user. The follow-on contact may be a request to continue completing the form, the results of a pre-screen that is performed on the partial collection of data that is provided to the user in another follow-on format, and the like.

Importantly, the embodiments of the present invention, as will be described below, provide a method and system for obtaining the information provided in a partially completed application which differs significantly from the conventional processes. In conventional approaches, when filling out an application on a network, such as to apply for a credit account, join a club, register for something, and the like, the user must key in a variety of information including: name, mailing address, home address, phone number, birthday, identification number, etc. If the user quits the process before it is completed, there may be no further actions available for the application provider. The completed information can be purged, deleted, or stored on the user's device, e.g., as a cookie, in case the user returns to the form to continue the process. Thus, the data is either lost to the application provider, or in the case where it is stored on the user device, the application provider will only have access to the data if the user returns to the host page such that the cookie can be accessed.

However, in contrast to the statements above, the present embodiments, as will be described and explained below in detail, provide a previously unknown procedure for obtaining the information from the application form fields within a given time period after the application form field has been completed and the user has moved on to another form field in the application. For example, instead of waiting a given amount of time and then performing a "save" type of function (which would likely miss any data that was entered after the last save until the point when the user abandoned the form), or saving at every key stroke (which would result in a significantly large amount of data to be moved, stored, and sorted), the present technology performs a collection of the data a predefined amount of time after the form field in the application has been accessed by the user. In so doing, embodiments prevent unnecessarily generating "targeting database" records with incomplete information.

Thus, embodiments of the present invention provide a streamlined method for application information acquisition which extends well beyond what was previously done and which provides a significant improvement to the way a computer system collects application information. The solution further provides a novel method for obtaining the provided information that streamlines the collection process, reduces the capture of incomplete information within the form fields of the application, and therefore increases the amount of usable data that is obtained from the user while reducing the amount of incomplete or unusable data that is collected and stored.

As will be described in detail, the various embodiments of the present invention do not merely implement conventional data acquisition processes on a computer. Instead, the various embodiments of the present invention, in part, provide a previously unknown procedure for obtaining information that is provided in a partially completed application. Hence, embodiments of the present invention provide a novel process for obtaining the information provided in a partially completed application which is necessarily rooted in computer technology to overcome a problem specifically arising in the realm of application abandonment.

Moreover, the embodiments do not recite a mathematical algorithm; nor do they recite a fundamental economic or longstanding commercial practice. Instead, they address a real-world challenge, the loss of completed applications due to application abandonment. Further, by using the technology as described, the data keyed into the application is stored at the IP or Session ID level. This information can include name, mailing address, home address, phone number, email address and other information, and in the case of a credit account application, can be used to pre-screen or pre-approve a consumer. If the consumer passes the pre-screening, a notice is then sent via email, direct mail, text, or the like to the user advising them they have been pre-screened and should complete the application. If the consumer is pre-approved, the pre-approval is then sent via email, direct mail, text, or the like to the user advising them they have been pre-approved and can accept an offer to open their new credit account.

In the following discussion, the term "pre-screen" is utilized. In general, pre-screen refers to a credit pre-screen for a user. That is, a screening of a user based on some sort of identification and credit-worthiness information that allows a likely credit determination to be performed via a credit reporting agency. For example, if Consumer 1 is pre-screened, identifying information would be obtained, such as, his name and current address. The name and current address would be used to perform a credit check of Consumer 1's credit history and qualifications based on the credit issuer's selection criteria. In one embodiment, the check may occur at one of a number of possible credit reporting agencies. However, in another embodiment, the check of Consumer 1's credit history may be limited, such as, to his credit history with one given credit reporting agency.

With regard to the term "pre-approval", pre-approval refers to the resultant of a credit review of the customer. If the customer's known credit history, credit rating, income, job status, or the like would qualify the customer for a credit account, an offer for a credit account can be provided to the customer.

In general, a pre-screen is a less formal review of a consumer's credit history and qualification (e.g., based on a limited amount of data) that suggests the likelihood that a given consumer applying for a credit account would qualify for the credit account. In contrast, a pre-approval is provided after a specific review of relevant consumer data has been performed and the consumer does qualify for a credit account. In one embodiment, aspects of the credit account, such as credit amount, program level, and the like, would be different based on different customer credit history, credit rating, income, job status, and the like.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, during the use of an issuer's mobile application, the user is prompted with a choice to affirmatively "opt-in" to various services. As a result, any information is obtained with the user's prior permission.

Moreover, depending on present or future credit pre-screening or pre-approval requirements, rules and regulations, the credit pre-screen or pre-approval described herein may be more or less formal. For example, if the legislation requires a user be informed, or provide authorization, before a review of the user's credit score is authorized, the credit pre-screen described herein would be modified to remain within the meets and bounds of the applicable laws.

Operation

Referring now to FIG. 1, a block diagram of a system 100 for partial application data collection is shown in accordance with an embodiment. Although a number of applications and components are shown in system 100, it should be appreciated that one or more of the components and applications may be combined. Similarly, one or more of the components and applications could be located separately from one another and communicate via a network such as the Internet, a WAN, LAN or the like.

In one embodiment, system 100 starts at 101 by defining form fields or select appropriately formatted form. At 102, the listener is appended to pre-defined, prioritized fields 102.

That is, the form fields are defined. The form fields can include aspects such as, session ID, name, label, values, address, email, phone number(s), etc. The form fields are then sorted prior to the application being presented to the user. The sorting causing the most important information, based on application type, to be provided first in the order of presentation on the application. For example, if the application is a credit account application the field order would be optimized by necessary data fields to offer credit in instance of an abandoned application. In other words, the name, address, email, phone number, gross income, and the like may be the first few fields presented by the application. In so doing, once the user provides the first few fields of information, the ability to perform a pre-screen on the user would be available. After the pre-screen is performed, e.g., by an application evaluator, the user could be contacted (e.g., by a notice provider) with an offer for a credit account via one of the provided methods, e.g., direct mail (home address), direct mail (employment address), email, text, phone call, etc. This sorting and prioritization of fields can be accomplished by methods including, but not limited to, designing versions of the interface to address different user devices or application types, responsive design techniques to collapse or expand content in response to the device form factor, or adaptive techniques to dynamically position fields appropriately based on similar variables.

In one embodiment, the order of the application fields may also be based on user input. For instance, if the user and brand align with a demographic that prefers email, the field for email will be placed before the field for address. Similarly, if the demographic aligns with a direct mail preferred audience, the field for address will be provided ahead of the field for email. In so doing, the application can capture the most useful pieces of information in the event of an abandoned application. This information will allow the application provider to reach out to the user at a later date.

At 103, it is determined if a session ID 105 exists. If the application interface input state matches the default or has no changes to the inputs, then at 104, a new input session is generated with an accompanying session ID. The session ID 105 is used to identify the inputs received from the user during the duration of the user's interaction with the application. As such, if the user logs out (or is otherwise disconnected) and then logs back in a new session ID 105 will be generated and tied to any input provided by the user to the application.

If at 103 a session ID 105 does exist, then the session ID 105 will be utilized. In one embodiment, when an input session has been generated or is found to already exist, the session ID 105 is provided to blur listener 110 via field on focus 111. For example, when an "exit" event is fired for each input, the system in 110 (as described in more detail herein) determines if a significant change has occurred to the interface input state. An input state refers to the collection of current values of inputs for an interactive user interface, agnostic of platform. Examples of user interface platforms include web, native mobile applications, a native kiosk and the like. Each user interface platform makes use of a mechanism for keeping track of the changes to inputs and events—an example of this is the document object model (DOM) for web interface platforms. These mechanisms include APIs that allow programmatic agents to "subscribe" to the changes in these input values or events using "listeners" and take appropriate action in an application. In addition, the application tracking mechanisms' APIs allows programs and scripts to dynamically access and update content, structure, and style of a document as shown and described in additional detail in FIG. 5. If a significant change to the interface input state is determined, the new input state is captured.

Blur listener 110 looks for a state change within a given field (for each input field) when the field is no longer focused. For purpose of the discussion, the field on focus 111 when the user clicks on a field, types in the field, selects a drop down in the field, or otherwise interacts with the field. In general, field refers to a field in a form that contains an area for user input. The field can receive type, selections, drop down options, etc. Examples of a number of fields 301-n of an application are shown in further detail in FIG. 3.

Blur counter 115 is a timer that is triggered once a field is no longer focused. In one embodiment, when the field on focus 111, the blur counter resets 112. Start blur counter 115 can have various settings depending on the field or business context. For example, a field that requires thinking might have blur counter 115 of 30 seconds or more. A field of relatively well known information that doesn't require thinking, like first name, blur counter 115 could be very short, like 10 seconds or less.

At 116, it is determined if the preset time has passed. That is, has blur counter 115 finished the countdown? If the countdown has not finished then an embodiment waits at 117 and continues to monitor the field to determine if the field on focus 111. In one embodiment, if the counter resets before it reaches 0 due to a re-focusing on the field, no data is collected. After the field is no longer in focus, the blur counter 115 is restarted. In other words, one embodiment resets the countdown timer when it is determined that the form field is again in focus. In one embodiment, the reset of the countdown timer occurring regardless of whether or not the countdown timer has completed a previous countdown. In general, the reset that includes the lack of data collection and the restart of the blur counter 115 is used to prevent unnecessarily generating incomplete or error filled records with incomplete information. For example, a user may complete the address field, leave the field, and then return to the field after noticing that they had misspelled the street (e.g., autocorrect, or the like). By not collecting the data and resetting the blur counter 115, the data that will be corrected once the user moves on from the address field will be correct and the previous incorrect data would have never been collected and would not cause issues in the user data file.

In one embodiment, at 120 when the preset countdown time of blur counter 115 is reached the form input state for the specific field in the application is captured. That is, upon completion of the countdown timer (e.g., the blur counter countdown) any data entered by the user into the one or more additional form fields is collected. In one embodiment, each of steps 111-120 is performed for each form field that is focused. In other words, one embodiment repeats the determining field on focus 111 (e.g., in focus), the countdown timer (blur counter 115), and the collecting of any data entered by the user into the form field (capture 120) for any additional form fields of the plurality of form fields of the application.

In one embodiment, the captured field data is combined with any other field data collected and the session ID which is then provided into a single user data file. In one embodiment, capture 120 is a data combiner that combines the data, any additional data, and the session ID into a single user data file. In one embodiment, when the preset countdown time of blur counter 115 is reached all of the data entered so far into the application is captured.

At 125, the information in the single user data file is compared with other user data files stored at a database such as targeting database 140. For example, the comparison can include aspects such as, Session ID, timestamp, channel (e.g., email, phone, address, etc.), name, or the like. In one embodiment, depending on preferred channel there could be other information such as push notification, etc. Mechanisms to optimize performance could include, but are not limited to, a securely cached version of the "last synchronized" state of the interface for quicker comparisons without requiring a round trip to a back-end server, or a queue of last several synchronized states to facilitate optimization for slow network conditions and other connectivity challenges with user devices.

In one embodiment, if the channel data, name data or the like matches an existing record but the session ID differs and the timestamp indicate a more recent record, the data in the targeting database 140 is updated to include the fresher timestamp. However, if the information in the single user data file does not match any records in the targeting database 140, a new record including the single user data file is added to the targeting database 140.

In one optional embodiment, at 130, the data is also compared to do not call, do not email, etc. lists to hygiene the list from opt outs prior to adding the single user data file to the targeting database 140. In another embodiment, a do-not-contact flag is added to the single user data file when a match is made between the single user data file and the do not contact list, and the single user data file is added to the targeting database 140.

In one embodiment, a pre-screen expiration date logic (e.g., "stale date" or expiration date evaluator) is used on the files within targeting database 140 to identify data files with timestamps no longer within the expiration date. In one embodiment, the targeting database will keep the record but provide a flag indicating that the record is outside of the pre-screen expiration date. In another embodiment, any expired data files will be deleted from the database when the expiration date passes. This could be 90 days, 180 days, etc. based on business rules, a predetermined time period, a user selected time period, or the like. In yet another embodiment, any flagged data files may be stored in a different database in order to maintain the information but remove it from the active targeting database 140.

At 150, a pre-screen or possibly a pre-approval is run on the user data stored in targeting database 140. At 160, if the user passes the pre-screen, a notice is sent to the user through user channel 180. In one embodiment, user channel 180 is an address and the notice is sent via direct mail. However, in another embodiment, user channel 180 may be selected from an email address, a telephone number, an employer address, or the like. In one embodiment, if the user passes a pre-approval criteria, a pre-approval offer is sent to the user through the user channel 180

With reference now to FIG. 2, a flowchart 200 of a method for obtaining information in a form field-by-form field manner for an application being filled out by a user on a second device is shown in accordance with an embodiment.

Referring now to 205 of FIG. 2, one embodiment stores, at a memory of a device, an application having a plurality of form fields. In one embodiment, the application is accessible to other devices over a network connection.

Referring now to FIG. 3, an example of an application 300 is shown in accordance with an embodiment. Application 300 includes a number of different user fillable fields including field 301-*n*. Although a number of fields are shown, it should be appreciated that there may be a different number of fields. Moreover, the fields may be on a single page, different pages, and the like. Further, the fields may be user fillable via typing, drop down options, selectable boxes within the field, and the like. Merely, for purposes of the discussion, application 300 includes 5 fields, name field 301, address field 302, telephone number field 303, email address field 304, and employer field n.

As will be discussed in detail herein, the order of fields 301-*n* can be reconfigured such that any of the fields are presented in any order. In FIG. 3, the address field 302 is provided before telephone number field 303 and email address field 304. However, if it was determined or the user identified a preferred channel of communication, the order of the fields will be modified. In one embodiment, the organization of the presentation of form fields 301-*n* is based on a user demographic that indicates a follow-up preference for the user in the event of application abandonment. In one embodiment, the user demographic is selected from, a user's age, a user's device type, a user selected contact preference, or the like.

For example, if the preferred channel is determined to be email, then the presentation of the form fields in the application would be adjusted such that the user completed email address field 304 before moving on to address field 302 and telephone number field 303. Similarly, if the preferred channel is determined to be text or telephone, then the presentation of the form fields in the application would be adjusted such that the user completed telephone number field 303 before moving on to address field 302 and email address field 304. Although a number of different form fields and form field organizations are shown, it should be appreciated that there are a number of different form fields that may be desired by the provider of the application. Further, the organization of the different form fields is also variable depending upon which information the provider of the application deemed to be of highest value.

With reference again to FIG. 2 and now to 210, one embodiment determines, by one or more processors on the device, that the user is accessing the application 300 from a user's device. The user's device being distinct from the device hosting the application as shown and described in FIG. 4. For example, the user's device may be a desktop computer, a laptop computer, a mobile phone, a smart phone, a tablet, a smart watch, a piece of smart jewelry, smart glasses, and other electronic devices having wireless connectivity. That is, the user's device would be capable of broadcasting and receiving via at least one network, such as, but not limited to, WiFi, Cellular, Bluetooth, NFC, and the like. In one embodiment, the user's device may have a positioning determining system.

Referring now to 215 of FIG. 2, one embodiment generates, by the one or more processors, a session identifier (ID) for the user accessing the application 300. In one embodiment, the session ID includes a timestamp. In general, the session ID is used to track the path through a website from a specific user. As such, the session ID becomes the instance of unique record, any information keyed in is attached with the session ID to identify the user. This information is combined with additional information provided by the user, such as address, email, and the like.

In one embodiment, described in more detail in the user data storage aspects, a plurality of different session ID's may be combined if the same user information, e.g., name, address, email, phone, etc. pops up more than once over different session ID's.

For example, a user has a first session ID and provides some identifying information but does not finish completing the application. When the user returns and begins completing the application again, a second session ID will be established. In the data assigned to the second session ID the user will again provide the same identifying information. Although there are two distinct session ID's, by comparing the underlying data provided, it can be determined that the two distinct session ID's are from the same user. By comparing the information, the duplication of user's based on different session ID's can be reduced. In such a case, it can be determined that the different session ID's are related to the same person and the information is combined into a single user data file. In one embodiment, the latest timestamp for any data added to the single user data file is maintained while any other timestamps in the single user data file are ignored or removed.

In one embodiment, if the second session information is different than the first session information, instead of relying on the timestamp to update the information to the latest received information, a data confidence evaluation is performed to determine which of the two pieces of information is more accurate. If it can be determined, the more accurate data is marked to be used and the other data is ignored. In other words, the data would be evaluated for accuracy and data with an older timestamp would be kept if the new data appears erroneous (i.e. incomplete address). For example, if the user name is Carl Spackler and the first session data included a home address that was 13 main street, and the second session data included a home address that was 13 market street, the data confidence evaluation could perform an address look up to determine which address is associated with Carl Spackler. If the correct address can be determined, then the file will include the appropriate address regardless of whether it was data from the first session or data from the second session.

In the case of certain or specific data, such as opt in/opt out status and the like, timestamps would be used to ensure that the most recent status was reflected in the single user data file.

With reference now to 220 of FIG. 2, one embodiment determines, by the one or more processors, that a state within a form field of one of the plurality of form fields 301-*n* is in focus. In general, the state of the form field is considered as being in focus when the user selects or otherwise interacts with the form field. For example, focus can include clicking on a field, typing in the field, tabbing to a field, and/or otherwise actively interacting with the field.

Referring now to 225 of FIG. 2, one embodiment determines, by the one or more processors, that the state within the form field is no longer in focus. For example, the user has moved on to a different field, has hit the tab or enter button to move to a different field, and the like. A blur listener 110 looks for a state within a given field e.g., name field 301 when the name field 301 is no longer "focused". Focus includes clicking on a field, typing in the field or otherwise actively interacting with the name field 301.

With reference now to 230 of FIG. 2, one embodiment initiates, by the one or more processors, a countdown timer. In one embodiment, the countdown timer is the blur counter 115 and the countdown timer initiates when the one or more processors determine that the form field is no longer in focus. For example, the blur counter 115 will start the countdown as soon as the user has hit the tab or enter button, clicked the mouse elsewhere, touched the screen in a different location, or otherwise removed the focus from the specific field.

Referring now to 235 of FIG. 2, one embodiment collects, by the one or more processors and when the countdown timer reaches zero, any data entered into the form field. In one embodiment, the countdown timer (or blur counter 115) is reset when it is determined that the form field is again in focus. In one embodiment, the resetting occurs even if the countdown timer was in the process of counting down and had not yet reached zero. In one embodiment, blur counter 115 utilizes a variable timing parameter for the countdown timer based upon a context of the form field.

In one embodiment, the captured field data is combined with any other field data collected and the session ID which is then provided into a single user data file. For example, the blur listener 110, blur counter 115 and capture 120 of data in the form field procedures are performed for each form field that is focused and then unfocused. In other words, one embodiment repeats the determining field on focus 111, the countdown timer (blur counter 115), and the collecting of any data entered by the user into the form field (capture 120) for any additional form fields of the plurality of form fields of the application.

With reference now to 240 of FIG. 2, one embodiment combines, by the one or more processors, all of the collected data and the session ID into a single user data file.

Referring now to FIGS. 1 and 2, one embodiment, accesses a database 140 comprising a plurality of stored user data files, the plurality of stored user data files collected from a plurality of users interacting with the application. The user identifying information within the single user data file is compared with user identifying information for each of the plurality of stored user data files. If any of the user's identifying information within the single user data file is a match with any of the user's identifying information within any of the plurality of stored user data files, then the new information is used to update the stored user data file with information from the single user data file on the database 140. When no match is found, the single user data file is stored at database 140.

In one embodiment, a pre-screen expiration date logic (e.g., "stale date") is used on the files within targeting database 140 to identify data files with timestamps no longer within the expiration date. For example, a review of the plurality of stored user data files stored in the database 140 is performed. The review identifying the timestamp for each of the plurality of stored user data files. A determination is then made between a length of time that has passed between the timestamp and a present time for each of the plurality of stored user data files to establish a user data file age for each of the plurality of stored user data files. The user data file age is then compared with a predefined expiration length of time.

In one embodiment, any of the plurality of stored user data files older than the predefined expiration length of time is removed. In another embodiment, the targeting database will keep the record but provide a flag indicating that the record is outside of the pre-screen expiration date. In another embodiment, any expired data files will be deleted from the database when the expiration date passes. This could be 90 days, 180 days, etc. based on business rules, a predetermined time period, a user selected time period, or the like. In yet another embodiment, any flagged data files may be stored in a different database in order to maintain the information but remove it from the active targeting database 140.

In one embodiment, a pre-screen is run on the user data stored in targeting database 140. If the user passes the pre-screen, a notice is sent to the user via a secondary channel (e.g., user channel 180). In one embodiment, the secondary channel is based on user preference. In one embodiment, secondary channel is selected from the group consisting of a direct mail, an email, a telephone call, a text message, an employer address, or the like. In one embodiment, the pre-approval notice includes a link that will direct the user's device to a prefilled application.

In one embodiment, in order to ensure compliance with any do not call laws, statutes, or practices, the information in the single user data file is compared with a do not contact list 130. In one embodiment, when a match is made between the single user data file and someone on the do not contact list, a do-not-contact flag is added to the single user data file. The do-not-contact flag may be a broad flag covering every communication channel, or it may be a specific flag that covers only one or more of the plurality of available communication channels. For example, the do-not-contact flag may refer only to using the telephone number in the single user data file. As such, a direct mail contact or email contact would not be barred. Similarly, the do-not-contact flag may refer to using the telephone number, and email in the single user data file. As such, a direct mail contact would not be barred.

Figure 4:
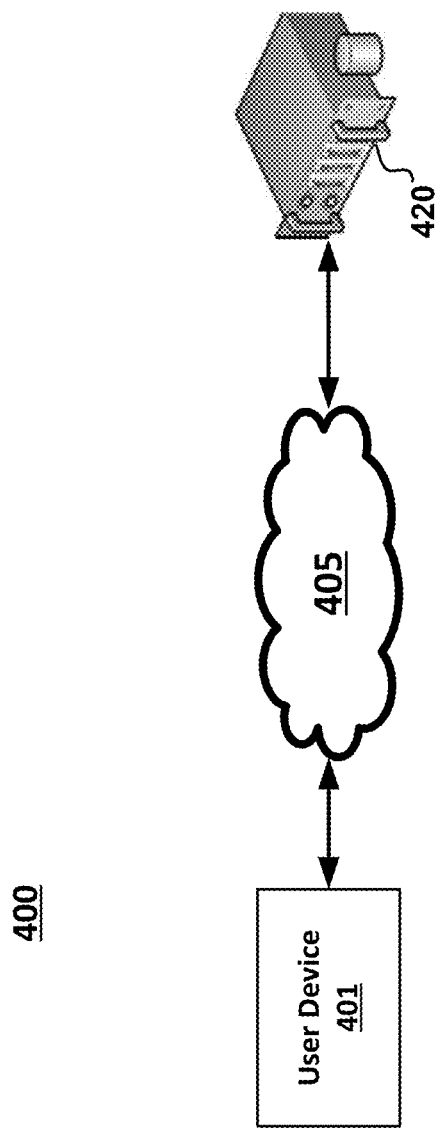
FIG. 4 is a block diagram of an overview of the user device communicating with the application maintaining device over a network, in accordance with an embodiment.

FIG. 4 is a block diagram 400 of an overview of the user computing device 401 communicating with the application maintaining device 420 over a network 405, in accordance with an embodiment.

Network 405 is a wired or wireless network such as the Internet, a wide area network (WAN), local area network (LAN), or the like. A wired network can include Ethernet cable(s), phone line(s), router(s), switch(es), and the like. Wireless communication network examples include: WiFi, Cellular, Bluetooth, NFC, and the like.

User computing device 401 may be a mobile computing device, notebook computing device, or desktop computing device. Example of mobile computing device include, but are not limited to, a mobile phone, a smart phone, a tablet, a smart watch, a piece of smart jewelry, smart glasses, or other user portable computational devices having wireless connectivity. User computing device 401 would be capable of broadcasting and receiving via network 405. In one embodiment, user computing device 401 has a positioning determining system. In another embodiment, user computing device 401 is able to determine location within a given radius, such as the broadcast range of a beacon, WiFi hotspot, overlapped area covered by a plurality of mobile telephone signal providers, or the like.

Application maintaining device 420 may be a mobile computing device, notebook computing device, or desktop computing device. In one embodiment, application maintaining device 420 may be a server that includes memory, processors, applications, operating systems and the like. Application maintaining device 420 can communicate with user computing device 401 on a secure channel via network 405. In one embodiment, application maintaining device 420 is responsible for each of the aspects of system 100.

Figure 6:
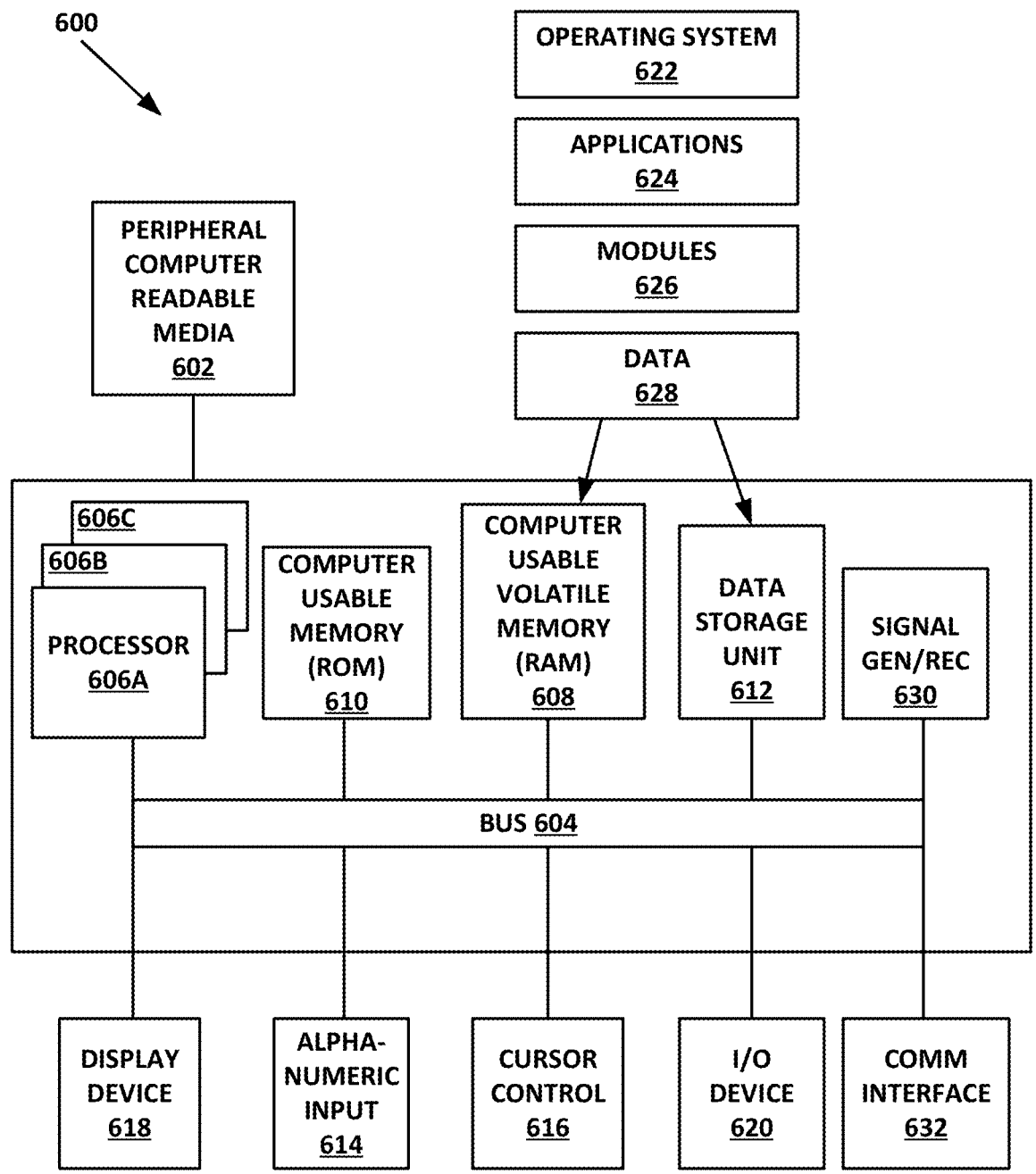
FIG. 6 is a block diagram of an example computer system with which or upon which various embodiments of the present invention may be implemented.

Further details and aspects regarding one or more components of user computing device 401 and application maintaining device 420 are described in FIG. 6.

Figure 5:
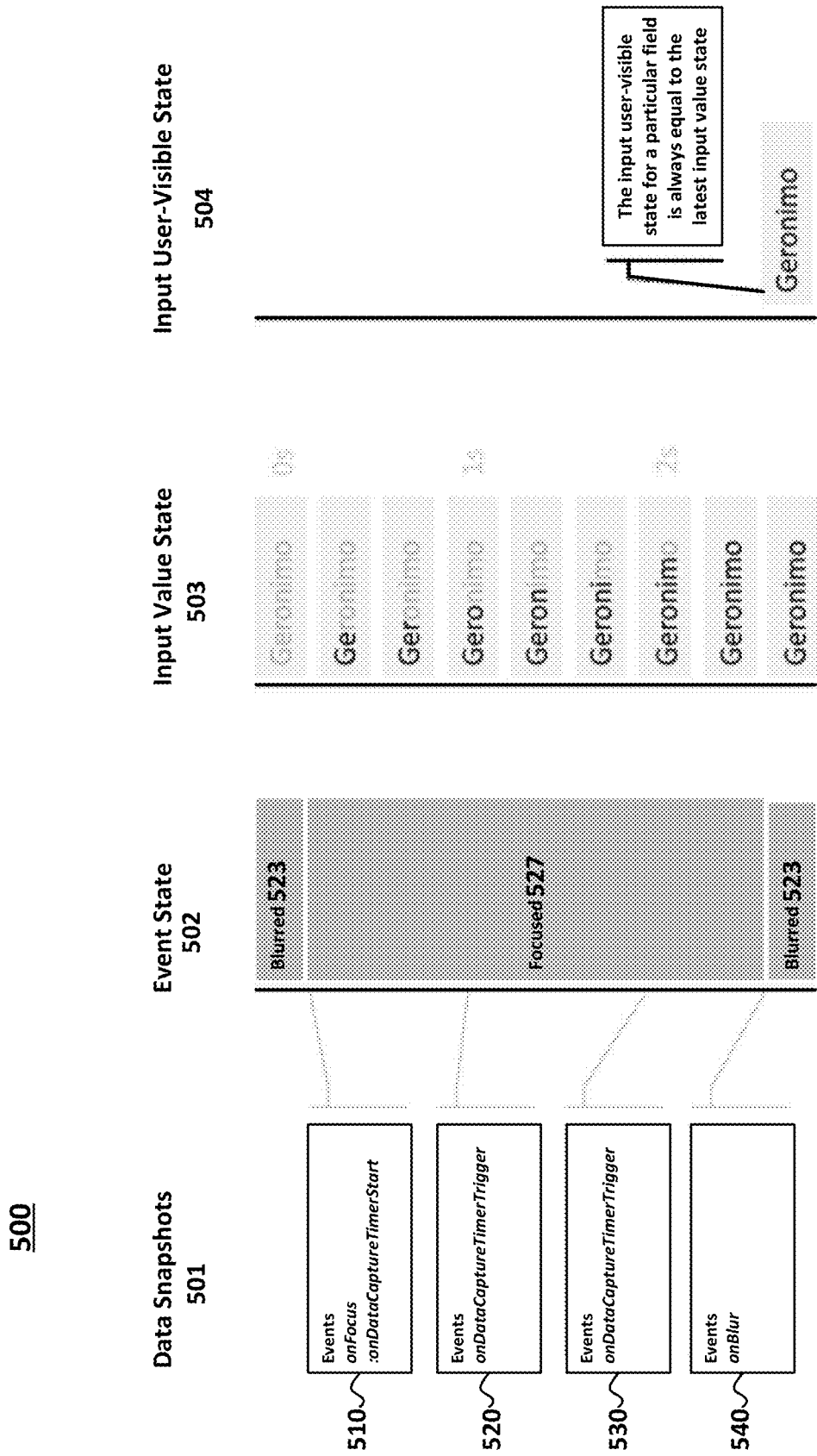
FIG. 5 is a flow diagram of a data capture event diagram, in accordance with an embodiment.

Referring now to FIG. 5 a flow diagram 500 of a data capture event diagram is shown in accordance with an embodiment. Flow diagram 500 includes data snapshots 501, event state 502, input value state 503 and input user-visible state 504.

Data snapshots 501 include aspects such as, but not limited to, events 510, e.g., :onFocus, :onDataCaptureTimerStart; events 520, e.g., onDataCaptureTimerTrigger; events 530, e.g., onDataCaptureTimerTrigger; and events 540, e.g., onBlur. One embodiment utilizes dataset labels based on the triggering event for the capture. E.g. "prefilled", "log", "blur", "focus", and the like to help with the decision on what are likely stages as the user filled the form. For example, blur events likely indicate the completeness of the source field for that blur event and as a result, can inform prioritizing snapshots captured onBlur over the timer triggered data captures.

One embodiment further uses a client-side methodology for detecting when to use the "pre-filled" label e.g. when onChange is triggered by multiple fields in quick succession. This may be the case when the user auto-fills the information in the form, and can be a hint to a high confidence in the values provided and the last snapshot generated in that sequence (each high value field may normally generate a data capture request, resulting in numerous capture requests from each field in the form in quick succession). In one embodiment, the data capture characteristics of flow diagram 500 capture data when the following events are fired for each field in the form: onFocus, onBlur, onDataCaptureTimerTrigger, onFormSubmit, onPrefill, and on ViewWillExit.

Event state 502 refers to whether the field is blurred 523 or focused 527. The input value state 503 refers to all values held by a particular field over time, as the user "enters" (onFocus) or "exits" (onBlur) the field. The user-visible state 504 refers to the value the user can see in a particular field at any point in time. This is always equal to the most recent (by time) input value state 503.

In one embodiment, the design and layout of the form fields are prioritized as "high value" fields e.g. fields that help with the targeting task to get information to the user on a follow-up (e.g. cellphone number, home address, email address etc.). A change event listener (onChange) will be utilized for high value fields, such that whenever the input value for a high value field changes, even if it's just by 1 character, a data capture is triggered.

Example Computer System Environment

With reference now to FIG. 6, portions of the technology for providing a communication composed of computer-readable and computer-executable instructions that reside, for example, in non-transitory computer-readable storage media (medium) of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components described herein may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a disk, a compact disc, a flash drive, and the like coupled thereto.

Computer system 600 of FIG. 6 includes an address/data/control bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. Computer system 600 also includes data storage features such as a computer usable volatile memory 608, e.g., random access memory (RAM), coupled to bus 604 for storing information and instructions for processors 606A, 606B, and 606C.

System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic disk drive, optical disk drive, solid state drive (SSD), and the like) coupled to bus 604 for storing information and instructions. Computer system 600 also includes an optional alpha-numeric input device 614 including alphanumeric and function keys coupled to bus 604 for communicating information and command selections to processor 606A or processors 606A, 606B, and 606C. Computer system 600 also includes an optional cursor control device 616 coupled to bus 604 for communicating user input information and command selections to processor 606A or processors 606A, 606B, and 606C. Optional cursor control device may be a touch sensor, gesture recognition device, and the like. Computer system 600 of the present embodiment also includes an optional display device 618 coupled to bus 604 for displaying information.

Referring still to FIG. 6, optional display device 618 of FIG. 6 may be a liquid crystal device, cathode ray tube, OLED, plasma display device or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick, non-contact input, gesture recognition, voice commands, bio recognition, and the like. In addition, special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. Computer system 600 also includes an I/O device 620 for coupling system 600 with external entities. For example, in one embodiment, I/O device 620 is a modem for enabling wired or wireless communications between system 600 and an external network such as, but not limited to, the Internet or intranet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the interne. In one embodiment, the present technology, for example, is stored as an application 624 or module 626 in memory locations within computer usable volatile memory 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface(s) 632 may include a serial port, parallel port, Universal Serial Bus (USB), Ethernet port, Bluetooth, thunderbolt, near field communications port, WiFi, Cellular modem, or other input/output interface. Communication interface(s) 632 may physically, electrically, optically, or wirelessly (e.g., via radio frequency) couple computer system 600 with another device, such as a mobile phone, radio, or computer system.

The computing system 600 is only one example of a suitable computing environment and is not intended to suggest any limitation as to the scope of use or functionality of the present technology. Neither should the computing environment be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method comprising:
   storing, at a memory of a device, an application form,
      the application form having a plurality of form fields,
      the application form being accessible to other devices over a network connection;
   determining, by one or more processors on the device, that a user is accessing the application form from a user's device, the user's device distinct from the device;
generating, by the one or more processors, a session identifier (ID) for the user accessing the application form,
the session ID including a timestamp;
determining, by the one or more processors, that a state within a form field of one of the plurality of form fields is in focus,
the state of the form field being in focus in response to the user selecting the form field,
determining, by the one or more processors, that the state within the form field is no longer in focus;
initiating, by the one or more processors, a countdown timer,
the countdown timer initiating when the one or more processors determine that the form field is no longer in focus;
collecting, by the one or more processors and when the countdown timer reaches zero, any data entered into the form field; and
combining, by the one or more processors, all of the collected data and the session ID into a single user data file.

2. The method of claim 1, wherein after said countdown timer initiating when the one or more processors determine that the form field is no longer in focus, said method further comprises:
resetting the countdown timer when the one or more processors determine that the form field is again in focus,
the resetting occurring before the countdown timer has reached zero.

3. The method of claim 1, further comprising:
utilizing a variable timing parameter for the countdown timer based upon a context of the form field.

4. The method of claim 1, further comprising:
repeating the determining, the countdown timer, and the collecting of any data entered by the user into the form field for any additional form fields of the plurality of form fields of the application form.

5. The method of claim 1, further comprising:
comparing information in the single user data file with a do not contact list; and
adding a do-not-contact flag to the single user data file when a match is made between the single user data file and the do not contact list.

6. The method of claim 1, further comprising:
accessing a database comprising a plurality of stored user data files, the plurality of stored user data files collected from a plurality of users interacting with the application form;
comparing user identifying information within the single user data file with user identifying information for each of the plurality of stored user data files;
determining if any of the user identifying information within the single user data file is a match with any of the user identifying information within any of the plurality of stored user data files;
updating, at the database and when a match is determined, the stored user data file with information from the single user data file; and
storing, at the database and when a match is not determined, the single user data file.

7. The method of claim 6, further comprising:
reviewing the plurality of stored user data files stored in the database;
identifying the timestamp for each of the plurality of stored user data files;
determining a length of time that has passed between the timestamp and a present time for each of the plurality of stored user data files to establish a user data file age for each of the plurality of stored user data files;
comparing the user data file age with a predefined expiration length of time; and
removing any of the plurality of stored user data files with the user data file age older than the predefined expiration length of time.

8. The method of claim 1, further comprising:
organizing an order of the plurality of form fields based on a user demographic,
the user demographic indicating a follow-up preference for the user in an event of an abandoned application form.

9. The method of claim 8, further comprising:
providing a form field for an email address before a form field for a mailing address or a form field for a phone number if the user demographic indicates an email preference;
providing a form field for a mailing address before a form field for an email address or a form field for a phone number if the user demographic indicates a direct mail preference; and
providing a form field for a phone number before a form field for or an email address or a form field for a mailing address if the user demographic indicates a text message or phone call preference.

10. The method of claim 1, further comprising:
utilizing the data in the single user data file to perform a pre-screening process; and
providing a notice to the user via a secondary channel,
the secondary channel selected from the group consisting of: an email, a direct mail, a text message, and a phone call.

11. The method of claim 10, further comprising:
providing a link in the notice, the link directing the user's device to a prefilled application form.

12. A non-transitory computer-readable medium storing instructions, the instructions comprising:
one or more instructions that, when executed by one or more processors, cause the one or more processors to:
determine that a user is accessing an application form from a user's device,
the application form having a plurality of form fields,
the application form stored at other than the user's device, and
the application form being accessible to other devices over a network connection;
generate a session identifier (ID) for the user accessing the application form,
the session ID including a timestamp;
determine that a state within a form field of one of the plurality of form fields is in focus,
the state of the form field being in focus in response to the user's selection of the form field,
determine that the state within the form field is no longer in focus;
initiate a countdown timer when the form field is no longer in focus;
collect, when the countdown timer reaches zero, any data entered into the form field;
repeat the determination that the state within one or more additional form fields of the plurality of form fields in the application form is no longer in focus, the initiation of the countdown timer for each of the one or more additional form fields, and the collection of any data entered by the user into the one or more additional form field upon completion of the countdown timer; and combine all of the data and the session ID into a single user data file.

13. The non-transitory computer-readable medium of claim 12, where the one or more instructions, when executed by the one or more processors, further cause the one or more processors to:

organize an order of at least a portion of a presentation of the plurality of form fields based on a user demographic, the user demographic indicating a follow-up preference for the user in an event of an abandoned application form, the user demographic selected from, a user's age, a user's device type, and a user selected preference; and present the plurality of form fields to the user in the order.

14. The non-transitory computer-readable medium of claim 12, wherein after said determination that said state within said form field is no longer in focus and said countdown timer is initiated, the one or more instructions, when executed by the one or more processors, further cause the one or more processors to:

reset the countdown timer when it is determined that the form field is again in focus, the reset of the countdown timer occurring regardless of whether or not the countdown timer has completed a previous countdown.

15. The non-transitory computer-readable medium of claim 12, where the one or more instructions, when executed by the one or more processors, further cause the one or more processors to:

utilize a variable timing parameter for one or more form fields based upon a context of the form field.

16. The non-transitory computer-readable medium of claim 12, where the one or more instructions, when executed by the one or more processors, further cause the one or more processors to:

access a database comprising a plurality of stored user data files, the plurality of stored user data files collected from a plurality of users interacting with the application form;

compare user identifying information within the single user data file with user identifying information for each of the plurality of stored user data files;

determine if any of the user identifying information within the single user data file is a match with any of the user identifying information within any of the plurality of stored user data files;

update, when a match is determined, the stored user data file with information from the single user data file; and storing, when a match is not determined, the single user data file on the database.

17. The non-transitory computer-readable medium of claim 16, where the one or more instructions, when executed by the one or more processors, further cause the one or more processors to:

review the plurality of stored user data files on the database;

identify the timestamp for each of the plurality of stored user data files;

determine a length of time that has passed between the timestamp and a present time for each of the plurality of stored user data files to establish a user data file age for each of the plurality of stored user data files;

compare the user data file age with a predefined expiration length of time;

select any of the plurality of stored user data files with the user data file age younger than the predefined expiration length of time;

compare the selected plurality of stored user data files with a do not contact list;

remove any of the selected plurality of stored user data files found on the do not contact list to result in a set of contactable selected plurality of stored user data files;

perform a pre-screen on each of the contactable selected plurality of stored user data files; and provide a notice to any of the contactable selected plurality of stored user data files that passes the pre-screen, the notice provided via a secondary channel, the secondary channel selected from the group consisting of: an email, a direct mail, a text message, and a phone call.

18. A system comprising:

an application form stored on a memory of a device, the application form having a plurality of form fields, the application form being accessible over a network connection;

one or more processors on the device, the one or more processors to determine that a user is accessing the application form from a user's device, the user's device distinct from the device;

the one or more processors to generate a session identifier (ID) for the user accessing the application form, the session ID including a timestamp;

a blur listener to determine that a state within a form field of one of the plurality of form fields is in focus, the state of the form field being in focus in response to the user's interaction with the form field, the blur listener to further determine that the state within the form field is no longer in focus;

a blur counter to initiate a countdown after the blur listener determines that the form field is no longer in focus;

the one or more processors to collect any data entered by the user into the form field when the countdown of the blur counter reaches zero;

the blur listener to determine that the state within one or more additional form fields of the plurality of form fields in the application form was in focus but is no longer in focus;

the blur counter to initiate the countdown for each of the one or more additional form fields;

the one or more processors to collect any additional data entered by the user into the one or more additional form fields when the countdown of the blur counter reaches zero; and a data combiner to combine the data, any additional data, and the session ID into a single user data file.

19. The system of claim 18, further comprising:

a database for storing a plurality of user data files; and an expiration date evaluator to:

review the user data files stored in a database;

identify the timestamp for each of the user data files;

determine a length of time that has passed between the timestamp and a present time for each of the user data files to establish a user data file age for each of the user data files;

compare the user data file age with a predefined expiration length of time; and remove, from a pre-screen process, any user data files with the user data file age older than the predefined expiration length of time.

20. The system of claim 19, further comprising:

an application form evaluator to perform a pre-screen on any of the user data files with the user data file age younger than the predefined expiration length of time; and a notice provider to provide a notice to any of the user data files that pass the pre-screen, the notice provided via a secondary channel selected from the group consisting of:

an email, a direct mail, a text message, and a phone call.

* * * * *